(12) United States Patent
Fountain et al.

(10) Patent No.: US 9,401,054 B2
(45) Date of Patent: Jul. 26, 2016

(54) VEHICLE TEST SEQUENCE COST OPTIMIZATION METHOD AND APPARATUS

(75) Inventors: Gregory J. Fountain, Kalamazoo, MI (US); Harry M. Gilbert, Portage, MI (US); Randy L. Mayes, Otsego, MI (US); Oleksiy Portyanko, Kalamazoo, MI (US); Olav M. Underdal, Kalamazoo, MI (US); William W. Witliff, III, Gobles, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 925 days.

(21) Appl. No.: 12/399,963

(22) Filed: Mar. 8, 2009

(65) Prior Publication Data
US 2010/0229044 A1    Sep. 9, 2010

(51) Int. Cl.
*G01M 17/00* (2006.01)
*G07C 5/08* (2006.01)
*G05B 23/02* (2006.01)

(52) U.S. Cl.
CPC ............. *G07C 5/0808* (2013.01); *G01M 17/00* (2013.01); *G05B 23/0251* (2013.01)

(58) Field of Classification Search
CPC ...... B64F 5/0045; G01M 17/00; G05B 23/02; G05B 23/0248; G07F 11/22; G07C 5/0808; G07C 5/0816

USPC ................ 714/26, 37, 38.1, 40, 47.1; 701/29; 702/108, 182–185
See application file for complete search history.

(56) References Cited

U.S. PATENT DOCUMENTS

| 4,985,857 | A | 1/1991 | Bajpai et al. |
| 6,748,304 | B2 * | 6/2004 | Felke et al. ..................... 701/29 |
| 6,751,536 | B1 * | 6/2004 | Kipersztok et al. ............. 701/29 |
| 7,925,397 | B2 | 4/2011 | Underdal et al. |
| 8,412,402 | B2 | 4/2013 | Underdal et al. |
| 2005/0038678 | A1 | 2/2005 | Qian et al. |
| 2006/0150018 | A1 * | 7/2006 | Cousin et al. ................... 714/26 |
| 2007/0294000 | A1 * | 12/2007 | Underdal ............... G06N 5/003 701/31.8 |

OTHER PUBLICATIONS

Non-Final Office Action for U.S. Appl. No. 13/794,039, dated Aug. 27, 2015.

\* cited by examiner

*Primary Examiner* — Joseph Kudirka
(74) *Attorney, Agent, or Firm* — Baker Hostetler LLP (57) ABSTRACT

A method for optimizing a test sequence to diagnose a failure mode of a device, such as a vehicle, is provided. At least one symptom of a fault of the device is received, and a plurality of taxonomies is generated. The taxonomies include a device component taxonomy, a fault taxonomy, and a diagnostic taxonomy, and each taxonomy has a plurality of nodes. At least one diagnostic test sequence, based on the symptom and the taxonomies, is generated, costs associated with the diagnostic test sequence are determined, and a cost optimal test sequence, based on the costs and the diagnostic test sequence, is generated.

5 Claims, 5 Drawing Sheets

VEHICLE TEST SEQUENCE COST OPTIMIZATION METHOD AND APPARATUS

FIELD OF THE INVENTION

The present invention relates generally to diagnostic equipment. More particularly, the present invention relates to the optimization of diagnostic test sequences, such as vehicle diagnostic test sequences, for diagnostic systems.

BACKGROUND OF THE INVENTION

Diagnostic systems are used by technicians and professionals in virtually all industries to perform basic and advanced system testing functions. For example, in the automotive, trucking, heavy equipment and aircraft industries, diagnostic test systems provide for vehicle onboard computer fault or trouble code display, interactive diagnostics, multiscope and multimeter functions, and electronic service manuals. In the medical industry, diagnostic systems provide for monitoring body functions and diagnosis of medical conditions, as well as system diagnostics to detect anomalies in the medical equipment.

In many industries, diagnostic systems play an increasingly important role in manufacturing processes, as well as in maintenance and repair throughout the lifetime of the equipment or product. Some diagnostic systems are based on personal computer technology and feature user-friendly, menu-driven diagnostic applications. These systems assist technicians and professionals at all levels in performing system diagnostics on a real-time basis.

A typical diagnostic system includes a display on which instructions for diagnostic procedures are displayed. The system also includes a system interface that allows the operator to view real-time operational feedback and diagnostic information. Thus, the operator may view, for example, vehicle engine speed in revolutions per minute, or battery voltage during start cranking; or a patient's heartbeat rate or blood pressure. With such a system, a relatively inexperienced operator may perform advanced diagnostic procedures and diagnose complex operational or medical problems.

The diagnostic procedures for diagnostic systems of this sort are typically developed by experienced technical experts or professionals. The technical expert or professional provides the technical experience and knowledge required to develop complex diagnostic procedures. Thus, the efficacy of the diagnostic procedures, in particular the sequence in which the diagnostic procedures are performed, is highly dependent on the expertise of the technical expert or professional authoring the procedures.

Thus, existing diagnostic systems have a disadvantage in that the sequence of execution of diagnostic procedures is highly dependent upon the expertise of the technical experts and professionals who author the diagnostic procedures. The technical experts and professionals often do not have access to complete information regarding various costs of diagnostic testing that has been performed, and in particular, information regarding the probable outcomes of diagnostic testing. As a result, diagnostic testing can consume unnecessary time and cost, because it is based on incomplete information. Accordingly, it is desirable to provide a method and apparatus for optimizing the sequence of diagnostic test procedures that can be executed on diagnostic systems.

SUMMARY OF THE INVENTION

The foregoing needs are met, to a great extent, by the present invention, wherein in one aspect an apparatus and method are provided that in some embodiments provide for optimizing a sequence of diagnostic procedures that can be executed on a diagnostic system.

In accordance with embodiments of the present invention, a computer-implemented method for optimizing a test sequence to diagnose a failure mode of a device, such as a vehicle, includes receiving at least one symptom of a fault of the device, generating a plurality of taxonomies, generating at least one diagnostic test sequence based on the symptom and the taxonomies, determining costs associated with the diagnostic test sequence, and generating a cost optimal test sequence based on the costs and the diagnostic test sequence. The taxonomies include a device component taxonomy, a fault taxonomy, and a diagnostic taxonomy, and each taxonomy has a plurality of nodes. Other embodiments of the present invention are directed to computer program products, diagnostic tools, apparatus, systems, etc.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment of the present inventive method and apparatus can provide a diagnostic test sequence optimizer that can determine a group of individual diagnostic tests, or procedures, related to a symptom from a pool of diagnostic procedures to diagnose a failure mode of a vehicle. The diagnostic test sequence optimizer can also include a failure mode analyzer that can quantify a comparative utility of the individual diagnostic tests, as well as a factor weighter that can assign a weight to each of a number of individual factors that can be figured into the failure mode analysis.

The diagnostic test sequence optimizer can further include a vehicle history receiver that can receive information regarding the maintenance and repair history of the vehicle under test, which can also be factored into the failure mode analysis. The diagnostic test sequence optimizer can also include a sequence optimizer that can arrange the order the diagnostic tests in accordance with the individual comparative utilities of the tests and other significant factors. In addition, the failure mode analyzer and the sequence optimizer can take into account user preferences to further optimize the diagnostic test sequence.

An embodiment of the diagnostic test sequence optimizer can complement or can be an integral part of a diagnostic test procedure generator. An example of a diagnostic test procedure generator that is compatible with the interactive diagnostic schematic generator is disclosed in co-pending U.S. patent application Ser. No. 11/452,250, entitled "Diagnostic Decision Sequencing Method and Apparatus for Optimizing a Diagnostic Test Plan," filed on Jun. 14, 2006 by Fountain, et al., the disclosure of which is hereby incorporated by reference in its entirety.

Figure 1:
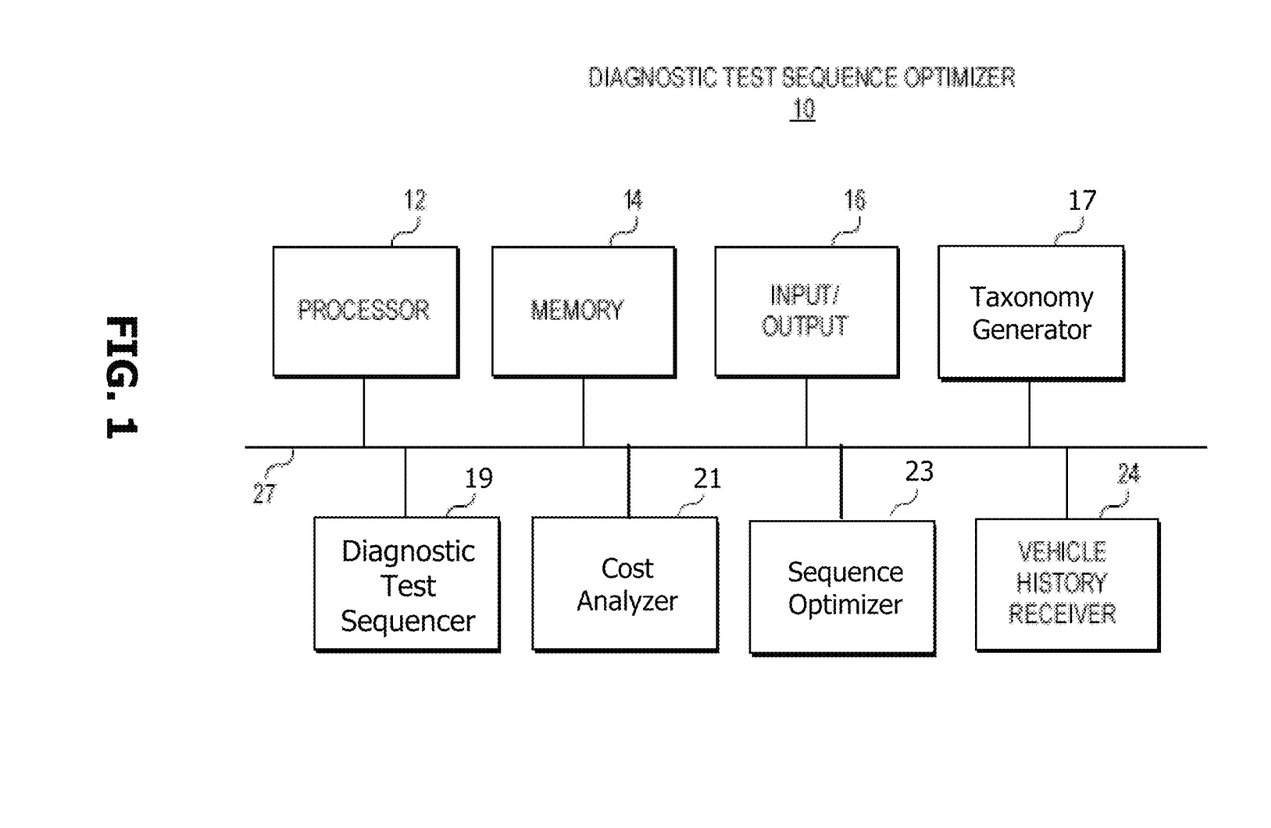
FIG. 1 is a schematic diagram illustrating a diagnostic test sequence optimizer in accordance with an embodiment of the present invention.

The invention will now be described with reference to the drawing figures, in which like reference numerals refer to like parts throughout. An embodiment of the present inventive apparatus and method is illustrated in FIG. 1, which illustrates a diagnostic test sequence optimizer 10. The diagnostic test sequence optimizer 10 can produce a vehicle diagnostic test sequence for use with, for example, a PC-based vehicle diagnostic system to provide instructions for expert diagnostic procedures to allow a vehicle technician to identify the cause of a trouble code or operational problem at the component level.

An example of a diagnostic method for use with a vehicle diagnostic system of this type is disclosed in U.S. Pat. No. 5,631,831, entitled "Diagnosis Method For Vehicle Systems," to Bird, et al., dated May 20, 1997, the disclosure of which is hereby incorporated by reference in its entirety. The diagnostic test sequence can navigate a vehicle technician through a step-by-step test sequence based on a vehicle onboard computer trouble code or a vehicle operational symptom. For example, during vehicle diagnostics, test step instructions and related information can be displayed to the vehicle technician on a display screen panel.

Diagnostic procedures can be authored, for example, by an expert vehicle technician, and subsequently ordered in an optimal sequence by the diagnostic test sequence optimizer 10. An example of a method for authoring diagnostic procedures for use with a vehicle diagnostic system is disclosed in U.S. patent application Ser. No. 11/052,118, filed by Fountain, et al. on Feb. 8, 2005, the disclosure of which is hereby incorporated by reference in its entirety.

Generally, FIGS. 1-6 are block diagrams and flowcharts of methods, apparatuses and computer program products according to various embodiments of the present invention. It will be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the disclosed functions.

As depicted in FIG. 1, an embodiment of the diagnostic test sequence optimizer 10 includes a processor 12, a memory 14, an input/output device 16, a taxonomy generator 17, a diagnostic test sequencer 19, a cost analyzer 21, a sequence optimizer 23 and a vehicle history receiver 24, all of which can be interconnected by a data bus 27, which may generally connect hardware components as well as software processes. The processor 12, the memory 14, the input/output device 16 and the display device 34 can be part of a general computer, such as a personal computer (PC), a notebook, a UNIX workstation, a server, a mainframe computer, a personal digital assistant (PDA), or some combination of these. Alternatively, the processor 12, the memory 14 and the input/output device 16 can be part of a specialized computing device, such as a vehicle diagnostics scan tool. The remaining components may be embodied within various hardware processing devices, such as, for example, microprocessors, microcontrollers, programmable logic devices (PLDs), field programmable gate arrays (FPGAs), etc., or these components may be embodied as software processes or modules that execute on processor 12. Other combinations of hardware and software components are also contemplated by the present invention. Generally, software components are loaded into memory 14 and executed by processor 12 to perform the desired functions of the diagnostic test sequence optimizer 10.

In various embodiments, the diagnostic test sequence optimizer 10 can be coupled to a communication network, which can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; a combination of any number of distributed processing networks or systems or the like.

An embodiment of the diagnostic test sequence optimizer 10 can be coupled to the communication network by way of the local data link, which in various embodiments can incorporate any combination of devices—as well as any associated software or firmware—configured to couple processor-based systems, such as modems, network interface cards, serial buses, parallel buses, LAN or WAN interfaces, wireless or optical interfaces and the like, along with any associated transmission protocols, as may be desired or required by the design.

Additionally, an embodiment of the diagnostic test sequence optimizer 10 can communicate information to the user and request user input by way of an interactive, menu-driven, visual display-based user interface, or graphical user interface (GUI). The user interface can be executed, for example, on a personal computer (PC) with a mouse and keyboard, with which the user may interactively input information using direct manipulation of the GUI. Direct manipulation can include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a touch screen or a voice-activated system.

Figure 7:
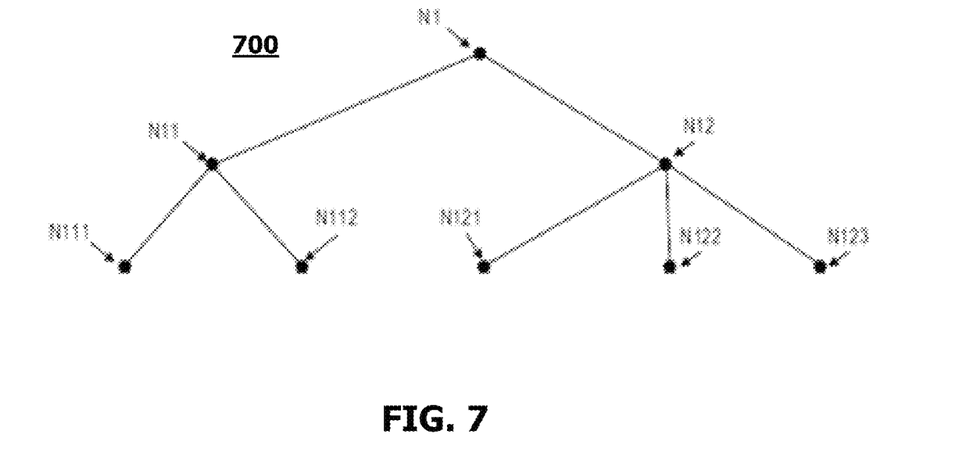
FIG. 7 illustrates a generic representation of a tree graph, in accordance with an embodiment of the present invention.
Figure 8:
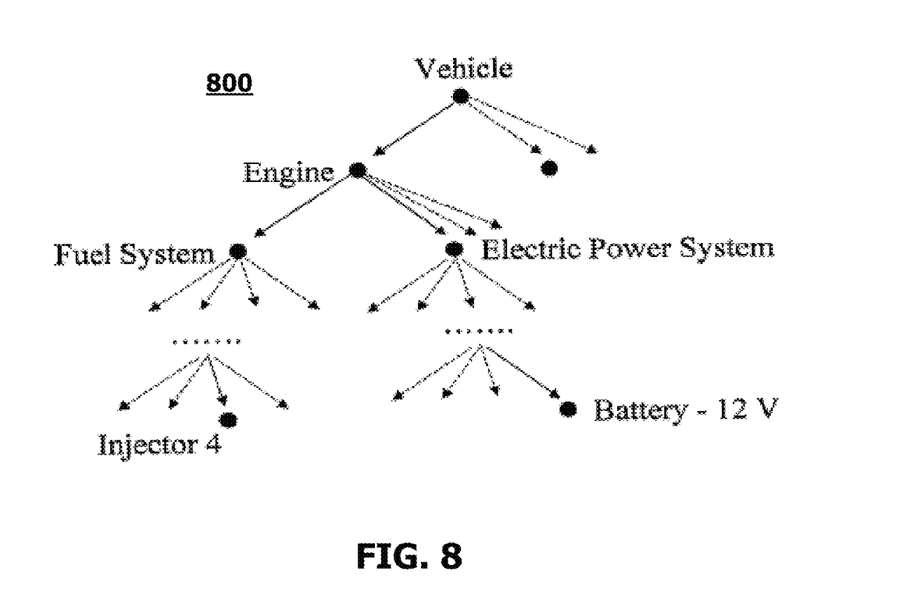
FIG. 8 depicts a component taxonomy for a vehicle, in accordance with an embodiment of the present invention.

The taxonomy generator 17 defines taxonomies representing various aspects of the vehicle. These taxonomies may be illustrated in the form of a connected acyclic directed graph, such as the tree graph 700 depicted in FIG. 7. Graph 700 is purposefully generic and may be viewed in many different ways. For example, viewing graph 700 as an abstraction of a component taxonomy, each node of graph 700 can represent a component, $CT_n$, of the vehicle. For example, the root node N1 can represent the vehicle as a single unit, and each node connected to the root node N1 can represent a major component of the vehicle. For example, node N11 can represent an engine, and node N12 can represent a transmission. Likewise, each of the connected "sibling" nodes can represent an individual subcomponent. For example, node N111 can represent a fuel control unit, and node N112 can represent an oxygen sensor, and so on. For example, FIG. 8 depicts a component taxonomy 800 for a vehicle.

In association with the component taxonomy, the taxonomy generator 17 also defines a fault taxonomy, by associating one or more failure modes with each component node, $FM^{n*} = \{FM^n_1, \ldots, FM^n_m\}$. For example, each associated failure mode can describe a specific modality of failure for the component, and the set of failure modes associated with a particular component, $FM^{n*}$, can represent all known ways the particular component can fail.

In association with the fault taxonomy, the taxonomy generator 17 also defines a diagnostic taxonomy by associating at least one failure mode test, $FMT^x_y$, with each failure mode, $FM^x_y$, which can be interpreted as an elementary diagnostic procedure intended to prove or disprove (conclusively or inconclusively) a hypothesis regarding the presence of a particular failure mode.

The taxonomy generator 17 may also define other taxonomies, such as a repair taxonomy, an information taxonomy, etc. A repair taxonomy may be defined, for example, by associating at least one repair procedure ($RP^x_y$) with each failure mode ($FM^x_y$). An information taxonomy (or service information taxonomy) may be defined, for example, by associating relevant information and documents, pertaining to a particular component, with that component ($CT_n$), as well as with connected or otherwise related components.

The diagnostic test sequencer 19 determines a group, or sequence, of diagnostic tests that are related to, or based on, a symptom of a vehicle operational fault, an onboard computer trouble code, etc. In one embodiment, this determination is based on the various taxonomies generated by taxonomy generator 17, as well as other information, as needed. In one preferred embodiment, diagnostic test selector 19 creates a diagnostic case history (DC*) in the form of an ordered list of diagnostic cases, such as, for example, DC=<p,d>, where "p" is a sample point in P, i.e., a snapshot of all parameters, a time-stamped sequence of sample points, etc., and "d" (i.e., "diagnosis") is an end-node leaf in the diagnostic taxonomy. In this embodiment, diagnostic test selector 18 also creates a diagnostic sequence (S) in the form of an ordered list, such as, for example, $<FMT^{p1}_{q1}, \ldots FMT^{pn}_{qn}>$, with the convention that the tests are prioritized to be executed in order from the front of the list.

The cost analyzer 21 determines a diagnostic cost, C, for each failure mode test. In one embodiment, C is the cost of performing the particular failure mode test, and is, generally, a scalar value, with a composite definition that can vary depending on circumstances. In one embodiment, C is calculated as the sum of Diagnostic_Time_Labor_Cost+Diagnostic_Material_Cost+Damage_Risk_Cost+Diagnostic_Requirements_Cost. These parameters may be calculated in various ways, For example, the Diagnostic_Time_Labor_Cost could be calculated based on a test that takes 5 minutes of a technician's time at $57.50/hour, i.e., a cost of $4.79 ($57.5*5/60). The Diagnostic_Material_Cost could be calculated as $0.09 for silicon lubricant. The Damage_Risk_Cost could be calculated as a test that need to remove a dashboard ($1,091) with 3% risk of destructive damage, i.e., a cost of $32.73. The Diagnostic_Requirements_Cost could be calculated as a test that needs a spectrum analyzer at an amortized usage rate of $0.74.

Generally, the cost function can be viewed as a generalized negative utility function, and can be defined according to parameters considered important in the specific context. For example, the cost function may only include time related parameters, and exclude reference to monetary costs. A success probability, P, may also be defined to denote the probability that a given failure mode test will confirm a failure, thereby completing the diagnosis. P may be a variant value, generally subject to reevaluation in accordance with Bayes Theorem as conditional probabilities change. Specifically, elimination of alternate failure modes may cause a renormalization update of remaining untested failure modes.

In a preferred embodiment, the expected cost for a complete diagnosis for a given decision sequence may be determined as follows.

Using standard list operator terminology, a recursive function may be used to express the expected cost:

$$EDC(T:L) = C_T + (1-P_T)EDC(\tilde{L})$$

$$EDC(<\ >) = 0$$

where $\tilde{L}$ denotes normalization of the sequence posterior to test T. In this embodiment, EC can also easily be expressed in non-recursive, closed form by means of nested summation:

$$EDC(S) = \sum_{i=1}^{n} C_i^T \left(1 - \sum_{j=1}^{i-1} P_j\right)$$

An optimal ordering criterion for decision sequences may be created as follows—starting with the following inequality:

$$EDC(T_A:<T_B:L>) \leq EDC(T_B:<T_A:L>)$$

The recursive definition of EC is expanded to obtain:

$$C_A + (1-P_A)\left[C_B + \left(1 - \frac{P_B}{1-P_A}\right)EDC(L)\right] \leq$$
$$C_B + (1-P_B)\left[C_A + \left(1 - \frac{P_A}{1-P_B}\right)EDC(L)\right]$$

Which may be rewritten as:

$$C_A+(1-P_A)C_B+(1-P_A-P_B)EC(L)] \leq C_B+(1-P_B)C_A+(1-P_A-P_B)EC(L)]-P_AC_B \leq -P_BC_A$$

From which the following 3 equivalent ordering criteria may be derived:

$$P_BC_A \leq P_AC_B [\ldots]$$

$$\frac{P_B}{C_B} \leq \frac{P_A}{C_A}$$

[Maximal Efficiency]

$$\frac{C_A}{P_A} \leq \frac{C_B}{P_B}$$

[Minimal Hypothetical Resolution Cost (HRC)]

The cost analyzer 21 uses the diagnostic cost, $C_q$, and the success probability, $P_q$, for a given failure mode test $T_q$, to calculate a hypothetical resolution cost, HRC, as $C_q/P_q$. For example, a test with zero (0) success probability has an infinite HRC value, a test that costs $100 and has a 0.1 (10%) success probability of a positive conclusion has an HRC value of $1,000, if the success probability is 0.5 (50%) then the HRC value is equal to twice the cost, if the success probability is 1.0 (100%) then the HRC value is equal to the test cost, etc.

In a preferred embodiment, test sequence S* is a unique sequencing of its member FM tests by their hypothetical resolution cost from lowest to highest. Using the HRC, S* has the lowest diagnostic resolution cost amongst all possible sequence ordering.

Accordingly, given a decision sequence $S^*=<T_1, T_2, \ldots T_n>$, which is ordered by hypothetical resolution cost:

$$S^* = <T_1, T_2, \ldots T_n> \Leftrightarrow \frac{C_q}{P_q} \leq \frac{C_{q+1}}{P_{q+1}}$$

in which a single Failure Mode is present and for which the diagnostic cost $C_i$ is independent of past test decisions, this sequence is optimal with respect to EDC:

$$\forall S \in \{S^*\}^P : EDC(S^*) \leq EDC(S)$$

Where $\{S^*\}^P$ is the set of all permutations of S*. The expected repair cost is defined in a similar manner:

$$ERC(T:L)=P_TC_T^R+(1-P_T)ERC(\tilde{L})$$

$$ERC(<>)=0$$

Which is equal to the weighted average of repair costs:

$$ERC(S) = \sum_{q=1}^{n} P_q C_q^R$$

In a preferred embodiment, a speculative diagnostic termination is defined as an experimental part replacement with a positive cost expectation, i.e., it is on average cost optimal to replace the part rather than continue the diagnosis. The Expected Total Cost, ETC, is defined as the sum of the expected diagnostic and repair cost:

$$ETC(L)=EDC(L)+ERC(L)$$

And for a given sequence, S=T:L, the speculative termination criteria is given in the form of an inequality:

$$C_T^R+(1-P_T)ETC(L) \leq ETC(T:L) \Leftrightarrow$$

$$C_T^R+(1-P_T)ETC(L) \leq C_T^D+P_TC_T^R+(1-P_T)ETC(L) \Leftrightarrow$$

$$C_T^R \leq C_T^D+P_TC_T^R \Leftrightarrow$$

$$C_T^D \geq C_T^R(1-P_T) \text{ [Speculative Termination Criteria]}$$

Accordingly, in this embodiment, if the cost of diagnosis is higher than the expected repair cost from an incorrect replacement, then it is cost optimal to perform a speculative repair.

In one embodiment, the sequence optimizer 23 performs an optimum test sequence as follows:

Input $S^*=<T_1:L>=<T_1, T_2, \ldots T_n>$, member tests ordered by HRC

Steps

Start: If $C_1^D < C_1^R(1-P_T)$ then perform test $T_1$ if success then repair component $CT_1$; terminate else restart with reduced sequence L else perform repair of component $CT_1$ if success     then terminate     else restart with reduced sequence L In another embodiment, the sequence optimizer 23 determines a dynamic decision sequence as an ordered list of failure mode tests, as follows:

$<T_1^{FM}, T_2^{FM}, \ldots, T_n^{FM}>$ where each member test is defined as $$T_q^{FM}=<TP_q^{FM}, \{PC_1, PC_2, \ldots, PC_m\}>$$

$TP_q^{FM}$ is the test procedure for $T_q^{FM}$, and $\{PC_1, PC_2, \ldots, PC_m\}$ is the set of preconditions for the test procedure, i.e. actions or state requirements needed before evaluating $TP_q^{FM}$.

Given the above, a diagnostic model may be defined as:

$$M=\{<S_1,T_{1,1}^{FM}>,<S_1,T_{1,2}^{FM}>,<S_1,T_{1,\ldots}^{FM}>,<S_1,T_{1,s}^{FM}>,<S_2,T_{2,1}^{FM}>,<S_2,T_{2,2}^{FM}>,<S_2,T_{2,\ldots}^{FM}>,<S_2,T_{2,t}^{FM}>,<S_{\ldots},T_{\ldots,1}^{FM}>,<S_{\ldots},T_{\ldots,2}^{FM}>,<S_{\ldots},T_{\ldots,\ldots}^{FM}>,<S_{\ldots},T_{\ldots,u}^{FM}>,<S_z,T_{z,1}^{FM}>,<S_z,T_{z,2}^{FM}>,<S_z,T_{z,\ldots}^{FM}>,<S_z,T_{z,v}^{FM}>\}$$

Where $S_x$ are the unique symptoms of M, and the set of tuplet members of M denote a non-injective and surjective mapping from $\{T_{x,y}^{FM}\}$ to $\{S_z\}$. The static diagnostic cost is the cost to perform a test starting from a well-defined ground state $\phi$ and may be defined as follows:

$$C^D(T_q^{FM} | \phi) = C^D(TP_q^{FM}) + \sum_{i=1}^{m} C^D(PC_i | \phi)$$

The state transition cost matrix for diagnostic model M may be defined as follows:

$$\underline{C}^M = \begin{bmatrix} C^D(PC_1|\phi) & C^D(PC_1|PC_1) & C^D(PC_1|PC_2) & \cdots & C^D(PC_1|PC_r) \\ C^D(PC_2|\phi) & C^D(PC_2|PC_1) & C^D(PC_2|PC_2) & \cdots & C^D(PC_2|PC_r) \\ \cdots & \cdots & & \cdots & \cdots \\ \cdots & \cdots & & \cdots & \cdots \\ C^D(PC_r|\phi) & C^D(PC_r|PC_1) & C^D(PC_r|PC_2) & \cdots & C^D(PC_r|PC_r) \end{bmatrix}$$

$$= \begin{bmatrix} C^D(PC_1|\phi) & 0 & C^D(PC_1|PC_2) & \cdots & C^D(PC_1|PC_r) \\ C^D(PC_2|\phi) & C^D(PC_2|PC_1) & 0 & \cdots & C^D(PC_2|PC_r) \\ \cdots & \cdots & & \cdots & \cdots \\ \cdots & \cdots & & 0 & \cdots \\ C^D(PC_r|\phi) & C^D(PC_r|PC_1) & C^D(PC_r|PC_2) & \cdots & 0 \end{bmatrix}$$

In an exemplary embodiment, a simplifying state transition cost may be used, and, for a single symptom related to 4 particular failure modes, the diagnostic cost model may be given as follows:

$$\forall x, y : x \neq y \rightarrow c(PC_x) = c(PC_x | PC_y)$$

Here, the cost of a precondition is independent of the prior state.

$$M = \langle S, T_1^{FM} = \langle TP_1^{FM}, \{\phi\}\rangle\rangle; P(T_1^{FM}) = 0.25$$
$$c(TP_1^{FM}) = 10 \; c(\phi) = 0 \; \langle S, T_2^{FM} = \langle TP_2^{FM}, \{PC_A\}\rangle\rangle; P(T_2^{FM}) = 0.25 \; c(TP_2^{FM}) = 5 \; c(PC_A) = 10 \; \langle S, T_3^{FM} = \langle TP_3^{FM}, \{PC_A\}\rangle\rangle; P(T_3^{FM}) = 0.25 \; c(TP_3^{FM}) = 3 \; c(PC_A) = 10 \; \langle S, T_4^{FM} = \langle TP_4^{FM}, \{PC_B\}\rangle\rangle; P(T_4^{FM}) = 0.25 \; c(TP_1^{FM}) = 3 \; c(PC_B) = 9$$

Using the standard HRC optimizing criteria and the static cost definition, the optimized test sequence is given as follows:

$$\langle TP_1^{FM}, TP_4^{FM}, TP_2^{FM}, TP_3^{FM} \rangle$$

In the above example, Test 2 and 3 are dependent on the same precondition and Test 3 can therefore be executed without incurring any additional cost (formally since $c(PC_A|PC_A) = 0$). This is exemplified by the "contracted" diagnostic model:

$$M' = \langle S, T_1^{FM} = \langle TP_1^{FM}, \{\phi\}\rangle\rangle; P(T_1^{FM}) = 0.25$$
$$c(TP_1^{FM}) = 10 \; c(\phi) = 0 \; \langle S, T_{23}^{FM} = \langle TP_{23}^{FM}, \{PC_A\}\rangle\rangle; P(T_{23}^{FM}) = 0.50 \; c(TP_2^{FM}) = 8 \; c(PC_A) = 10 \; \langle S, T_4^{FM} = \langle TP_4^{FM}, \{PC_B\}\rangle\rangle; P(T_4^{FM}) = 0.25 \; c(TP_1^{FM}) = 3 \; c(PC_B) = 9$$

With the optimized sequence:
$$\langle TP_{23}^{FM}, TP_1^{FM}, TP_4^{FM} \rangle$$
Which, in the original model M, translates to:
$$\langle TP_2^{FM}, TP_3^{FM}, TP_1^{FM}, TP_4^{FM} \rangle$$

In this embodiment, M' may be viewed as a homomorphic image of M, assuming an appropriate definition of a diagnostic model as an algebraic structure. Accordingly, this method presents a systematic consideration of the cost of dynamic preconditions in the sequencing of diagnostic tests. In further embodiments, this method is extended with domain tests, which do not isolate a failure mode, but rather pass or fail a node contained in a component taxonomy. A domain test outcome will result in a contraction of the remaining test sequence, by either removing all tests associated with subcomponent failure modes (in the case of a component pass) or by removing all tests for failure modes for components not contained in the tested components (in the case of a component fail). Further embodiments augment this dynamic decision sequencing method to operate within taxonomical structures of components, symptoms, and failures, with probability assessment derived from associated Bayesian networks, including fault dependency networks, covering non-exclusive and causally dependent failure modes.

The user may enter the success probabilities associated with the various failure mode tests; alternatively, an abstract belief domain order may be used to impose a relative ordering relation on the failure mode domain. In one embodiment, a simple domain ordering could introduce the terms "high," "medium," and "low" to denote relative failure probability. In another embodiment, a float ordering domain, $DO^n$, includes domain ordering descriptor members, $P_1^{DO}, \ldots, P_n^{DO}$, for n=5, the domain descriptors might be named Very_High_Probability, High_Probability, Medium_Probability, Low_Probability, Very_Low_Probability, etc. For any ordering, a suitable discrete probability distribution, in the form of a normalized probability mass function f, over the member domain, can be determined such that $f(P_x^{DO}) > f(P_{x+1}^{DO})$. Various orderings are contemplated by the present invention, including a uniform linear domain ordering, a logarithmic domain ordering, a domain ordering over generalized lattices, etc.

In a uniform domain ordering embodiment, from the case $f(P_x^{DO}) = f(P_{x+1}^{DO})$, the order may be given as follows:

$$P(X_i) = \frac{1}{n} \quad \text{for } i = 1, \ldots, n$$

The uniform order may be relevant for any situation where there is no known reason to impose an ordering relationship.

In a linear domain ordering embodiment, with a normalized linear distribution with n domain members, the order may be given as follows:

$$P(X_i) = \frac{(n+1)}{\frac{n}{2}(n+1)} \left( \frac{n+1-i}{n+1} \right)$$

The above expression is composed of a normalizing factor and a base distribution, which reduces to:

$$P(X_i) = \frac{2}{n} \frac{(n+1-i)}{(n+1)} = \frac{2}{n}\left(1 - \frac{i}{(n+1)}\right) \quad \text{for } i = 1, \ldots, n$$

Example Values

|   | 1 | 2 | 3 | 4 | 5 | 6 | 7 | 8 | 9 | 10 | 11 | 12 | 13 | 14 | i |
|---|---|---|---|---|---|---|---|---|---|----|----|----|----|----|---|
| n 1 | 1.000 | | | | | | | | | | | | | | |
| 2 | 0.667 | 0.333 | | | | | | | | | | | | | |
| 3 | 0.500 | 0.333 | 0.167 | | | | | | | | | | | | |
| 4 | 0.400 | 0.300 | 0.200 | 0.100 | | | | | | | | | | | |
| 5 | 0.333 | 0.267 | 0.200 | 0.133 | 0.067 | | | | | | | | | | |
| 6 | 0.286 | 0.238 | 0.190 | 0.143 | 0.095 | 0.048 | | | | | | | | | |
| 7 | 0.250 | 0.214 | 0.179 | 0.143 | 0.107 | 0.071 | 0.036 | | | | | | | | |
| 8 | 0.222 | 0.194 | 0.167 | 0.139 | 0.111 | 0.083 | 0.056 | 0.028 | | | | | | | |
| 9 | 0.200 | 0.178 | 0.156 | 0.133 | 0.111 | 0.089 | 0.067 | 0.044 | 0.022 | | | | | | |
| 10 | 0.182 | 0.164 | 0.145 | 0.127 | 0.109 | 0.091 | 0.073 | 0.055 | 0.036 | 0.018 | | | | | |
| 11 | 0.167 | 0.152 | 0.136 | 0.121 | 0.106 | 0.091 | 0.076 | 0.061 | 0.045 | 0.030 | 0.015 | | | | |
| 12 | 0.154 | 0.141 | 0.128 | 0.115 | 0.103 | 0.090 | 0.077 | 0.064 | 0.051 | 0.038 | 0.026 | 0.013 | | | |
| 13 | 0.143 | 0.132 | 0.121 | 0.110 | 0.099 | 0.088 | 0.077 | 0.066 | 0.055 | 0.044 | 0.033 | 0.022 | 0.011 | | |
| 14 | 0.133 | 0.124 | 0.114 | 0.105 | 0.095 | 0.086 | 0.076 | 0.067 | 0.057 | 0.048 | 0.038 | 0.029 | 0.019 | 0.010 | |

In a logarithmic domain ordering embodiment, the order may be given as follows:

$$P(X_i) = -\frac{1}{\text{Ln}(1-p)} \frac{p^i}{i}$$

For $p \to 1$ (i.e., the natural logarithmic domain order), the normalized example values are as follows:
1.000
0.667 0.333
0.545 0.273 0.182
0.480 0.240 0.160 0.120
0.438 0.219 0.146 0.109 0.088
0.408 0.204 0.136 0.102 0.082 0.068
0.386 0.193 0.129 0.096 0.077 0.064 0.055
0.368 0.184 0.123 0.092 0.074 0.061 0.053 0.046
. . .
For $p=0.5$ the normalized example values are as follows:
1.000
0.800 0.200
0.750 0.188 0.063
0.733 0.183 0.061 0.023
0.726 0.182 0.061 0.023 0.009
0.723 0.181 0.060 0.023 0.009 0.004
0.722 0.181 0.060 0.023 0.009 0.004 0.002
0.722 0.180 0.060 0.023 0.009 0.004 0.002 0.001
. . .

In a generalized lattice domain ordering embodiment, with three probabilities (High, Medium, Low) assigned to a symptom with seven failure modes as follows, H M M M M L L, one probability distribution may be obtained by setting n=3 and normalizing the resulting outcome, as follows:
Initial Probability Values
0.545 0.273 0.273 0.273 0.273 0.182 0.182
Normalized Probability Values
0.273 0.137 0.137 0.137 0.137 0.091 0.091
Another probability distribution may be obtained by setting n=7 and average the results for M and L, as follows:
0.386 0.124 0.124 0.124 0.124 0.060 0.060
A further probability distribution may be obtained by setting n=3 and normalizing sequentially, as follows:
0.545 0.085 0.085 0.085 0.085 0.057 0.057

The vehicle history receiver 24 receives a history of the vehicle, for example, a maintenance or repair record kept with the vehicle, at a service center, or by the manufacturer. For example, the vehicle history can include information such as the mileage on the subject vehicle, the specific configuration of the vehicle, a modification such as a technical service bulletin that has been performed on the vehicle, a vehicle maintenance record, a service center maintenance record associated with the specific vehicle or type of vehicle, or a manufacturer warranty record associated with the specific vehicle or type of vehicle.

Moreover, the diagnostic test sequence optimizer 10 can be combined with additional diagnostic system capabilities, such as vehicle state tracking, a graphical user interface and interactive diagnostic schematics, to form an intelligent diagnostic system that can aid vehicle technicians in resolving vehicle operational problems in an optimized manner.

For example, the current vehicle state can be used in optimizing the diagnostic test sequence. That is to say, preconditions required for a diagnostic procedure such as cover panels or components that are removed or modified during individual diagnostic procedures, test equipment that is connected to the vehicle, and similar such information related to the vehicle state can be used by the sequence optimizer 23 to optimize the diagnostic test sequence.

Figure 2:
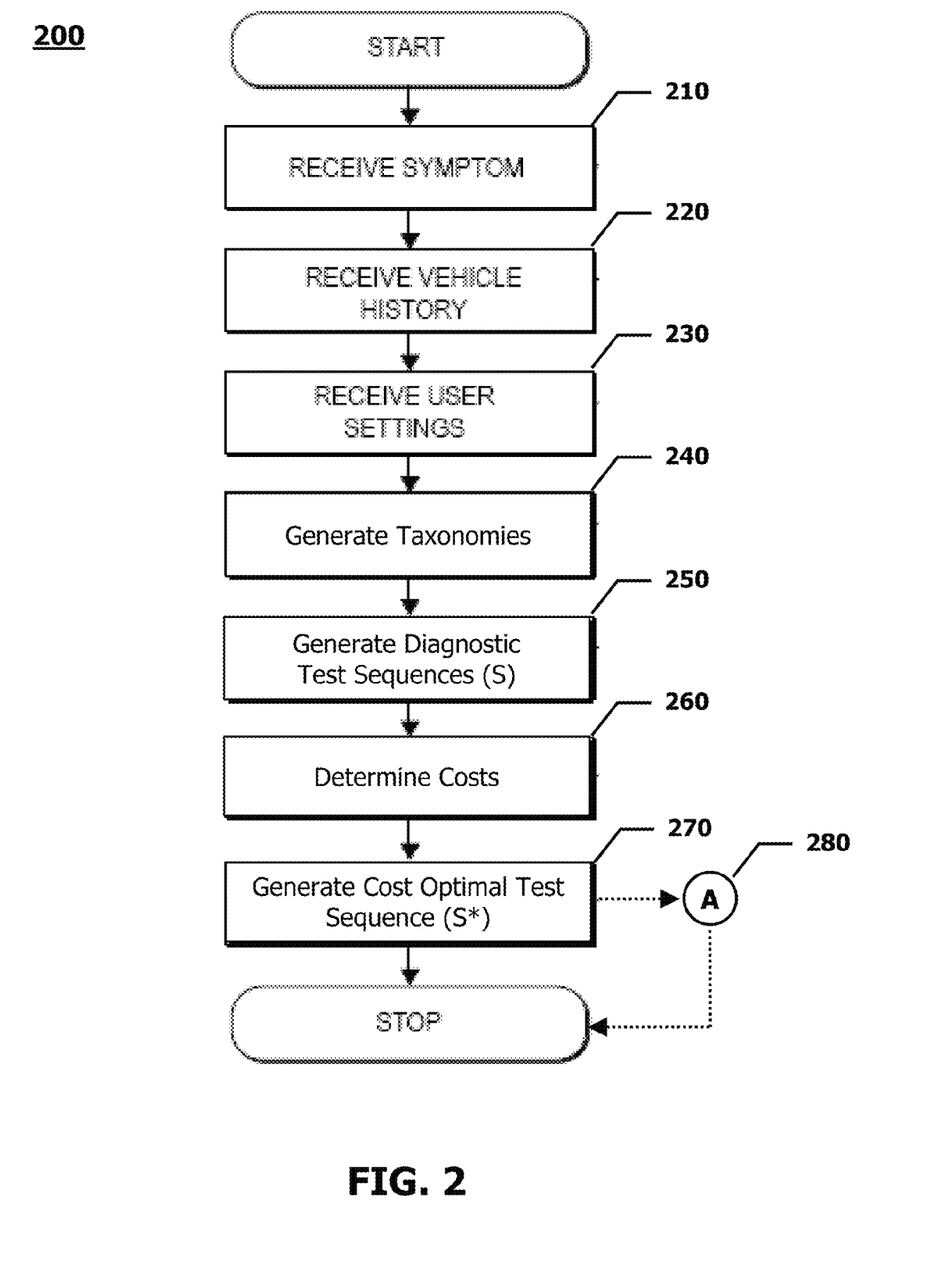
FIG. 2 is a flow chart depicting a method for optimizing a diagnostic test sequence, in accordance with an embodiment of the present invention.

FIG. 2 illustrates a method 200 for optimizing a diagnostic test sequence, in accordance with an embodiment of the present invention. Initially, symptoms, such as vehicle operational problems, diagnostic trouble codes, etc., may be received (210) for diagnosis. Historical information regarding a specific test subject vehicle may also be received (220), such as vehicle mileage, vehicle configuration, vehicle modifications, maintenance record or warranty record. Optionally, user preferences may also be received (230).

Figure 3:
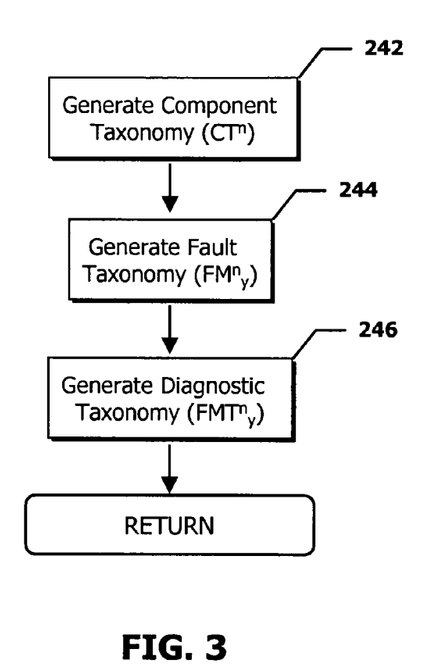
FIG. 3 is a flow chart providing additional detail regarding taxonomy generation, in accordance with an embodiment of the present invention.

One or more taxonomies may then be generated (240), as discussed above. For example, as depicted in FIG. 3, step 240 may include generating a vehicle component taxonomy $CT_n$, (242), generating a fault taxonomy $FM''_y$ (244), generating a diagnostic taxonomy $FMT''_y$ (246), as well as generating a repair taxonomy, generating an information taxonomy, etc.

Figure 4:
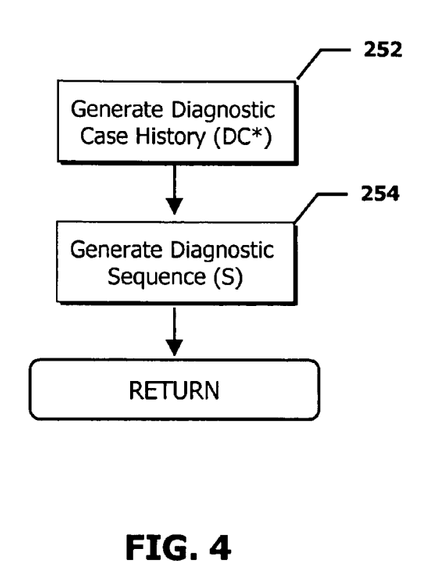
FIG. 4 is a flow chart providing additional detail regarding diagnostic test sequence generation, in accordance with an embodiment of the present invention.

One or more diagnostic test sequences may then be generated (250), as discussed above. For example, as depicted in FIG. 4, step 250 may include generating a diagnostic case history DC* (252), generating a diagnostic sequence S (254), etc.

Figure 5:
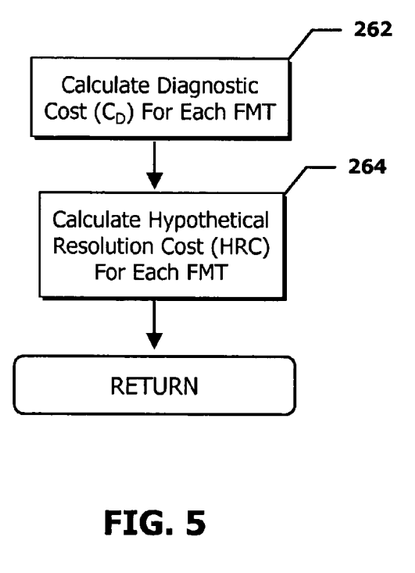
FIG. 5 is a flow chart providing additional detail regarding cost analysis, in accordance with an embodiment of the present invention.

Generally, the costs are then determined (260), as discussed above. For example, as depicted in FIG. 5, the diagnostic cost $C_D$ associated with each failure mode test FMT is calculated (262) and then the hypothetical resolution cost HRC for each FMT is calculated (264).

An optimal test sequence S* is then generated (270), as discussed above. In a preferred embodiment, S* is a unique sequencing of its member FMTs by their respective HRCs, from lowest cost to highest cost.

Figure 6:
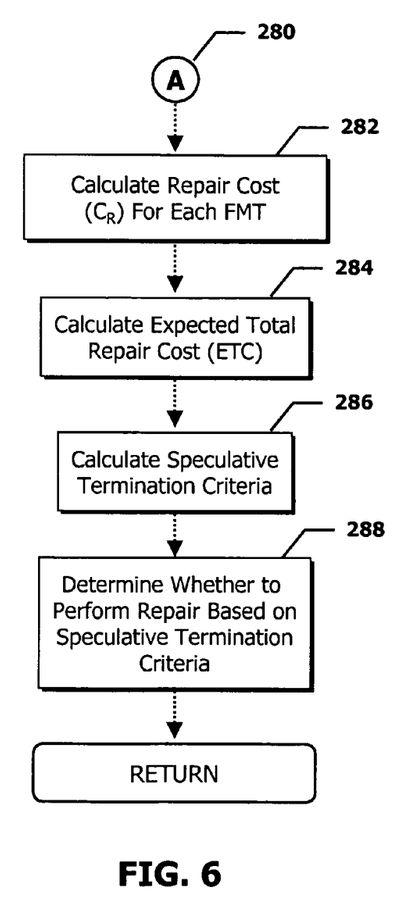
FIG. 6 is a flow chart providing detail regarding speculative repair termination, in accordance with an embodiment of the present invention.

In another embodiment, a speculative diagnostic termination may be performed, as discussed above as and represented by the link "A" 280 in FIGS. 1 and 6. For example, as depicted in FIG. 6, an expected repair cost $C_R$ is calculated (282), followed by the expected total repair cost ETC (284). The speculative termination criteria is then calculated (286), and the determination (288) whether to perform the repair is then made based on the speculative termination criteria.

In one example of an embodiment of the present invention, the diagnosis of a particular vehicle fitted with a fuel injected and electronic control unit controlled engine is performed. In this embodiment, the vehicle exhibits the symptom S of "Rough Idle", i.e. rapid variation of RPM and engine "sputtering" under attempted idle conditions, normal idle meaning the engine operating stably at a static RPM of approximately 800 with enough power to overcome internal friction, but not enough power to move the vehicle.

For symptom S, Table 1 presents several failure modes that may be established, with diagnostic and repair cost, and initial relative probability rankings (Very High, High, Medium Low, Very Low):

TABLE 1

| Name | Description | D– | R– | % |
|---|---|---|---|---|
| FM | O2 Sensor failure | 39 | 81 | V |
| FM | Ignition wiring failure | 20 | 113 | H |
| FM3. | Vacuum leaks - Minor | 75 | 35 | H |
| FM3. | Vacuum leaks - Major | 75 | 367 | M |
| FM | Valve adjustment failure | 20 | 32 | M |
| FM | Spark plug failure | 20 | 102 | M |
| FM | Ignition Coil failure | 20 | 93 | L |
| FM | Mass airflow sensor dirty | 22 | 15 | V |
| FM | Mass airflow sensor failed | 45 | 226 | V |
| FM1 | Throttle position sensor failure | 30 | 87 | VL |
| FM1 | General ECU Failure | 139 | 758 | VL |

A numerical probability estimate is assigned for the natural logarithmic domain order, with n=11:

TABLE 2

| | FM1 VH | FM8 VH | FM9 VH | FM2 H | FM3 H | FM4 M | FM5 M | FM6 M | FM7 L | FM10 VL | FM11 VL |
|---|---|---|---|---|---|---|---|---|---|---|---|
| n = 11 | 0.331 | 0.166 | 0.110 | 0.083 | 0.066 | 0.055 | 0.047 | 0.041 | 0.037 | 0.033 | 0.030 |
| | 0.202 | 0.202 | 0.202 | 0.075 | 0.075 | 0.048 | 0.048 | 0.048 | 0.037 | 0.032 | 0.032 |

With the probabilities determined, the table is updated, sequencing the failure modes by hypothetical resolution cost, and the normalized probability for each failure mode is calculated under a sequential evaluation. For each failure mode, the expected cost of an incorrect replacement (right hand side of the speculative termination criteria) is then calculated:

TABLE 3

| Name | Description | D-Cost | R-Cost | % | ~% | HRC | ECIR |
|---|---|---|---|---|---|---|---|
| FM8 | Mass airflow sensor dirty | 22 | 15 | 0.202 | 0.202 | 108.91 | 11.97 |
| FM1 | O2 Sensor failure | 39 | 81 | 0.202 | 0.253 | 193.07 | 60.52 |
| FM9 | Mass airflow sensor failed | 45 | 226 | 0.202 | 0.338 | 222.77 | 149.53 |
| FM2 | Ignition wiring failure | 20 | 113 | 0.075 | 0.190 | 266.67 | 91.54 |
| FM4 | Valve adjustment failure | 20 | 32 | 0.048 | 0.150 | 416.67 | 27.20 |
| FM6 | Spark plug failure | 20 | 102 | 0.048 | 0.176 | 416.67 | 84.00 |
| FM7 | Ignition Coil failure | 20 | 93 | 0.037 | 0.165 | 540.54 | 77.64 |
| FM10 | Throttle position sensor failure | 30 | 87 | 0.032 | 0.171 | 937.50 | 72.11 |
| FM3.a | Vacuum leaks - Minor | 75 | 35 | 0.075 | 0.484 | 1,000.00 | 18.06 |
| FM3.b | Vacuum leaks - Major | 75 | 367 | 0.048 | 0.600 | 1,562.50 | 146.80 |
| FM11 | General ECU Failure | 139 | 758 | 0.032 | 1.000 | 4,343.75 | 0.00 |

In this example, it has been determined that the mass airflow sensor should always be cleaned immediately, rather than expending further cost on diagnosing the sensor, since the cost of diagnosis is higher than the expected cost of an unnecessary cleaning. It is marginally cost optimal to perform a diagnosis on the function of the oxygen sensor.

The estimated remaining service life of the component may also be taken into account, either by incorporating this term directly into the termination criteria, or by applying a Bayesian adjustment of the failure probability based on age. For example, even though, in this case, a speculative replacement is not cost optimal for a good oxygen sensor, if the oxygen sensor was found to be very old or degraded, it may be better to immediately replace the sensor rather than spend half the cost of replacement to diagnose the sensor.

If a diagnostic session has reached FM3 without a resolution, it may be optimal to perform speculative minor leak repair, such as, for example, systematic tightening of seals, etc., whereas the cost of an incorrect major leak repair, such as, for example, installation of new parts in engine inflow, is so high that a diagnosis is warranted.

Also in this example, the replacement of the engine control unit, the last step in the sequence, assuming all other failure mode tests have been negative, should be performed without any diagnosis, as the expected cost of an incorrect replacement is zero.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A vehicle diagnostics scan tool for optimizing a diagnostic test sequence to diagnose a failure mode of a vehicle, comprising:

an input that receives at least two symptoms of a fault or fault codes from the vehicle, wherein the vehicle diag nostics scan tool is wirelessly connected to a memory located on a server, and the vehicle diagnostics scan tool is capable of receiving a history of the vehicle from a service center or a manufacturer of the vehicle;

a diagnostic test sequencer that generates at least one diagnostic test sequence based on the at least two symptoms of a fault or fault codes and a plurality of taxonomies;

a cost analyzer that determines costs associated with the at least one diagnostic test sequence;

a sequence optimizer that generates a cost optimal test sequence based on the costs and the at least one diagnostic test sequence; and at least one processor, coupled to the input, wherein the diagnostic test sequencer, the cost analyzer and the sequence optimizer are software modules adapted to be executed by the at least one processor;

wherein one symptom of the at least two symptoms is a rough idle, and a plurality of failure modes are established for the rough idle, where the processor calculates a diagnostic cost, a repair cost, an expected cost for an incorrect replacement, and an initial relative probability ranking for each failure mode for the rough idle;

wherein one of the plurality of failure modes is an oxygen sensor failure, and another of the plurality of failure modes is a mass air flow sensor failure, where it is determined that the mass airflow sensor is to be cleaned, without expending further cost on diagnosing the mass airflow sensor;

wherein an estimated remaining service life of the oxygen sensor is taken into account, such that if the oxygen sensor is found to be old or degraded, the oxygen sensor is then determined to be replaced before spending further cost to diagnose the oxygen sensor.

2. The vehicle diagnostics scan tool of claim 1, wherein an estimated remaining service life of the oxygen sensor is taken into account by incorporating the estimated remaining service life directly, or by applying a Bayesian adjustment of a failure probability based on age of the oxygen sensor or the mass air flow sensor.

3. The vehicle diagnostics scan tool of claim 1, wherein a current vehicle repair state is used to optimize the at least one diagnostic test sequence to determine whether a precondition for the at least one diagnostic test sequence has occurred, by determining whether a step in disassembly of the vehicle needed to conduct the at least one diagnostic test sequence has occurred, or by determining whether a component needed to conduct the at least one diagnostic test sequence has been added to the vehicle.

4. The vehicle diagnostics scan tool of claim 3, wherein the vehicle diagnostics scan tool is wirelessly connected to a memory located on a server, and wherein the vehicle diagnostics scan tool is capable of receiving a history of the vehicle from a service center or a manufacturer of the vehicle.

5. The vehicle diagnostics scan tool of claim 4, wherein the precondition for the at least one diagnostic test sequence includes whether cover panels or components have been removed or modified during other individual diagnostic procedures, or whether test equipment is connected to the vehicle.

* * * * *